Sept. 12, 1944.    H. K. NAJARIAN    2,358,024
FURNACE CHARGE DISTRIBUTION
Filed Feb. 20, 1942
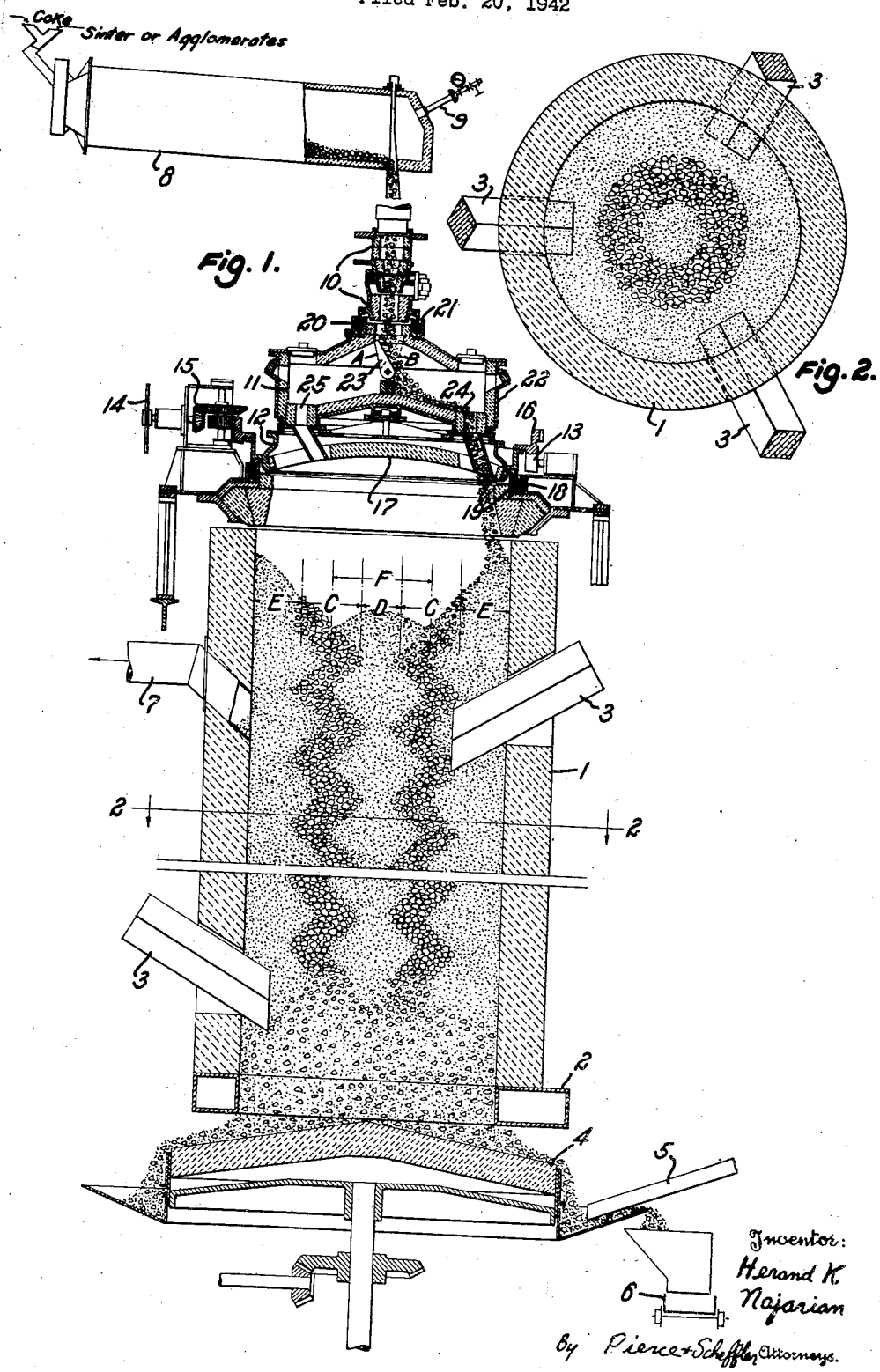

Patented Sept. 12, 1944

2,358,024

UNITED STATES PATENT OFFICE 2,358,024

FURNACE CHARGE DISTRIBUTION

Herand K. Najarian, Beaver, Pa., assignor to St. Joseph Lead Company, New York, N. Y., a corporation of New York Application February 20, 1942, Serial No. 431,747

6 Claims. (Cl. 75—10)

This invention relates to the smelting of metalliferous materials in vertical shaft furnaces, and particularly to the smelting of ores and compounds of volatile metals such as zinc, magnesium, and the like, in electric furnaces of the type wherein the furnace charge constitutes the resistor.

Typically electric furnaces in which the charge is the resistor are of the vertical shaft type, preferably of circular cross-section, and have electrodes of some suitable material positioned some distance apart vertically, connected to a source of electric energy and extending through the refractory wall of the furnace, making contact with the charge therein.

The charge to be smelted typically comprises mixture of ores and compounds of metals, preferably agglomerated, sintered, or briquetted, and reduction fuel in the form of lumps of coke or coal in such a physical state as to permit passage of gases and vapors through the interstices thereof, and permeable to the passage of electric current.

In such an assembly, when adequate voltage is imposed on the charge through the medium of the contacting electrodes, the electric energy is converted to heat energy within the body of the charge by virtue of the resistance of the material comprising the charge. The heat energy thus released raises the temperature of the charge, causing chemical reaction between the reduction fuel and the ores or compounds of metals, liberating the metallic constituents of the charge in vapor form.

It is an object of the invention to provide a more effective distribution of charge in vertical shaft furnaces.

It is a further object of the invention to so distribute the charge in an electric furnace of the type above described as to effectively control the flow, direction and the path of the electric current through the body of the charge.

It is a further object of the invention to control the heat distribution in the furnace and to utilize the heat energy effectively, thus securing economical smelting of the charge.

A further object of the invention is to prevent, by means of proper charge distribution, overheating of certain constricted zones in the furnace charge, inhibit formation of liquid slag, and prevent waste of heat energy in such overheated zones.

Still a further object of the invention is to prevent overheating of the refractory lining of the furnace walls by proper heat distribution in the charge.

The invention comprises introducing into a vertically disposed, shaft type, electric furnace a charge composition adapted, upon heating, to liberate the desired metals in fluid form, said charge comprising mixtures of sintered, agglomerated, or briquetted ores or metalliferous material, together with reduction fuel such as coke or coal in lump form, the particles of the entire charge being sized within appropriate limiting dimensions, and disposing said charge mixture so as to obtain in the furnace a predetermined distribution of the various size components of said charge to permit definite control of the flow, direction, and path of the electric current within the body of said charge, and thus obtain the desired disposition of the heat energy released for the most effective heating and economical smelting of the furnace charge. The invention also includes suitable apparatus for effectuating the objects of the invention.

When electric current is caused to pass through a body having such a charge composition, at first the entire body begins to heat more or less uniformly. Soon, however, a certain narrow zone in the body of the charge and between the current-supplying electrodes commences to get hotter than the adjacent areas. Such overheated zone becomes more permeable to the passage of electric current, by virtue of the higher temperature, and permits the passage of electric current at an accelerated rate of flow per unit of sectional area. As the current continues to flow, this overheated zone gets smaller in cross-section and assumes increasingly higher temperatures. The electrical characteristics exhibited by such a charge mixture, upon heating, are at variance with the characteristics exhibited by first-class conductors, such as the metals copper, aluminum, and the like, in which the resistance to passage of electric current increases substantially uniformly throughout the body of the conductor, with the increase in temperature of the conductor.

In a furnace charge comprising variously sized particles of more or less uniformly proportioned mixtures of ores or compounds of metals, in sintered, agglomerated, or briquetted form, and reduction fuel, such as coke or coal, permeability to the passage of electric current in any portion or zone of the charge body is proportional to the average size of particles of the charge materials within the said zone. The resistance of such a zone or column of charge comprises resistance due to the average specific resistance of the charge particles plus "contact resistance," due to the total number of points of contact between the particles comprising the charge column. Given two columns of charge with the same cross-sectional area, and composed of particles of the same average specific resistance, the column of charge having larger average particle size offers less resistance to the passage of electric current, by virtue of having a lesser total number of contacts between particles and, consequently, having less total resistance than the column having materials of relatively smaller particle size.

When a charge as above described, having the above-mentioned electrical characteristics, is placed in a shaft type electric furnace without due regard to proper distribution in respect to the sizes of particles comprising the charge in the furnace, soon after electric current begins to flow through the charge certain narrow zone or zones between the contact areas of the electrodes assume higher temperatures than the surrounding charge. This condition is known to furnace operators as "streaking" and results in liquid slag being formed in these zones of excessively high temperature, making the discharge of the residues from the furnace difficult and irregular, and causing the furnace operation to be generally erratic. Furthermore, as part of the electric current is wasted in producing excessively high temperatures in these narrow zones of low permeability, it becomes increasingly difficult to raise the temperature of the other parts of the furnace charge to proper smelting temperature, resulting in deficient smelting in cooler parts of the furnace, and, in turn, in lower recovery. Often the temperatures in these streaking zones get so high that impurities of very high boiling point, such as compounds of manganese, iron, lead, and the like, will vaporize and contaminate the vapors of the volatile metals coming off the furnace.

In the electric furnaces designed for smelting ores or compounds of volatile metals, the charge is heated only to a temperature sufficiently high to liberate the volatile metals. It is undesirable to have temperatures so high that the charge will liquefy and form slag. It is further desirable to have the residues from the furnace discharge in solid form so as to permit disposal of same with continuously operated mechanical devices. Furthermore, while it is recognized that highest smelting efficiency in furnace operation would result from having uniform temperatures through the entire body of the furnace charge, experience has shown that better overall efficiency and more successful, uninterrupted operation of the furnaces over long periods can be obtained and excessive deterioration of the furnace walls prevented by operating the furnaces in such a manner as to establish in the central portion of the charge column and extending between the electrodes and throughout the smelting zone, a vertical core or zone in the charge column, the temperature of which is maintained somewhat higher than the portion of the charge surrounding it, and adjacent the walls of the furnace. It has been proposed, therefore, in operating commercial furnaces of relatively small bore, to crush the charge mixture comprising the metalliferous agglomerates and reduction fuel, size the crushed product within appropriate limits, and place the charge into the furnace by means of a rotating distributor so designed as to project the material flowing into the furnace adjacent the furnace wall at the top of the charge, allowing the larger particles of the charge mixture to roll by gravity towards the center of the furnace, thus obtaining a gradation of particle sizes of the charge mixture from the center of the furnace to the periphery of the charge, the larger size charge particles being positioned at or near the center of the furnace and the smaller size particles near the periphery of the charge next to the furnace wall, with a more or less gradual decrease in particle size from the center towards the periphery of the charge. This method of operation has been described by George F. Weaton and Carleton C. Long in Technical Publication No. 1040 of the American Institute of Mining and Metallurgical Engineers.

With the above described method of charge distribution it is obvious that the center portion of the furnace charge column will have relatively higher permeability per unit of cross-sectional area to the passage of electric current than the peripheral portion of the charge, with a gradual increase in permeability from the periphery towards the center. By variations in the limits of sizing of the particles of the charge mixture, it is possible to obtain any desired differential between the central zone of higher permeability and the peripheral zone of lower permeability. Electrothermic furnaces for the production of zinc metal and zinc oxide pigments, as an example, designed along the lines above indicated, with diameters ranging from 48 inches to 60 inches, heights ranging from 30 feet to 40 feet, and with electrodes spaced 20 feet to 24 feet apart vertically, have been operated successfully over long periods and with high efficiency employing a charge mixture of zinc sinter and agglomerates, and coke fuel, the entire charge being sized within limits of $+\frac{1}{4}$ and $-\frac{3}{4}$ inch. With the requisite amount of power input and charge distribution as above described, the temperatures in the furnace range from 900° C. to 950° C. at or near the periphery of the charge next to the furnace walls, gradually increasing towards the center and reaching a temperature range of 1100° to 1150° C. at the core. The diameter of the core, depending on operating conditions in the furnace, varies from 12 inches up to 36 inches. Under the operating conditions above outlined, a very large percentage of the furnace charge at the smelting zone is at or above the smelting temperature for ores or mixtures of zinc. The above-mentioned central core or zone being at a higher temperature than the average furnace temperature, provides some excess heat reserve to compensate for slight variations in power input, generally stabilizing the operation, while the relatively cooler portion of the charge, being next to the wall, serves to protect the wall from rapid deterioration due to excessive temperatures and liquid slag, and also serves to filter out some of the higher boiling point impurities in the zinc vapors as such vapors pass through the charge towards the vapor outlet of the furnace.

While the above described method of charge distribution has been used successfully in electrothermic furnaces of comparatively small dimensions, for example, up to 60 inches in diameter, and has made successful and economical operation possible over extended periods, in furnaces of larger dimensions (say 8 feet or 10 feet in diameter) the above described method of charge distribution, whereby a central zone or core of relatively high permeability is maintained in a furnace during operation, has not proven economical or practical. In a furnace with a comparatively large cross-sectional area and with charge distribution as hereinbefore mentioned, when an attempt is made to pass a sufficient amount of power through the charge to bring the peripheral zone or lower permeability zone in the charge to smelting temperature, the core or narrow central zone of higher permeability gets excessively hot, often before the peripheral zone comes up to the smelting temperature, resulting in liquid slag formation in the central zone, consumption of power at a higher rate per ton of metal produced, and, in general, irregular operation and unstable furnace conditions.

In order to obviate these difficulties and to permit operating furnaces of large cross-sectional area successfully and with high operating efficiency, I have found that the aforementioned core or zone having relatively higher permeability to the passage of electric current must be positioned, not at the central portion of the furnace charge, but in an annular zone intermediate a central zone of lower permeability and a peripheral portion, also of the lower permeability, immediately adjacent the walls of the furnace. I accomplish this by a novel method of charge distribution comprising continuously introducing the charge and distributing same in the furnace so that the coarser particles of the charge are segregated within a vertical annular zone spaced from the walls of the furnace. Furthermore, my method of charge distribution provides for contraction and expansion of the mean diameter and area of the annular core or zone comprising the relatively coarse material of the charge as required by operating conditions while the charge is fed continuously into the top portion of the furnace charge.

In vertical section the annular core or zone of higher permeability thus formed typically exhibits a tortuous or zig-zag path which can be controlled as to magnitude and position as the operation of the furnace may require, by manipulation of the charging operation.

A preferred embodiment of the charge distribution system will be more particularly described with reference to the accompanying drawing, in which:

Fig. 1 is vertical cross-section on center line of a shaft type electric furnace of circular cross-section, showing charge preheating drum, rotating top of charge distributor on top of the furnace, and a residue disposal mechanism at the bottom of the furnace, comprising a rotatable table, plow, and conveyor, and Fig. 2 is a cross-section of the furnace, taken intermediate the current-supplying electrodes, on line 2—2 of Fig. 1.

The electric furnace, of the type described in U. S. Patent 1,775,591, primarily comprises a vertically-disposed, refractory-lined furnace shell 1 supported on water-cooled ring 2, and other auxiliary supports (not shown), current-supplying electrodes 3, charge feeding mechanism at the top, as hereinafter fully described, a rotatable charge discharge table 4, plow 5, and conveyor 6 for the disposal of furnace residues, and vapor outlet 7. The vapors of the metals coming off the furnace may be burned in the air to make oxides of the metals to be recovered, such, for example, as zinc oxide, or condensed into liquid metal.

The cold charge, comprising agglomerates of ores, for example, roasted and sintered zinc sulfide ores, and coke in lump form, sized within limits of $+\frac{1}{4}$ inch and $-\frac{3}{4}$ inch, is fed into a rotating refractory-lined heating drum 8, heated by gas burner 9, and is heated to a temperature somewhat below the smelting temperature of the ore. An object of this preheating is to conserve expensive electric energy by bringing the charge near to the smelting temperature before feeding it into the furnace. The heated charge from the rotary preheater drops through the constricted vertical passageway 10 into distributor trough 11, which is mounted centrally on furnace top 12, carried on rollers 13, and rotatable through sprocket 14 and train of drive gears 15 meshing with ring gear 16. The rotating furnace top 12 is provided with refractory lining 17 to protect the metal parts from the heat of the furnace, removable ring gear 16 to permit rotation and provide annular surface for support of the furnace top on carrying rollers 13, and a downwardly projecting lip 18 running in an annular trough 19 containing sand, and fastened to top of the furnace structure, thus forming a sand seal and preventing escape of gases from the furnace. On top of the distributing trough 11 and fastened to same, is another annular trough 20 containing sand, and concentrac with the furnace top 12. A stationary lip 21 extends downwardly from the tubular refractory-lined structure, forming the vertical passageway 10, and is immersed in the bed of sand in the rotating trough 20 to form a gas-tight seal. The distributor trough 11, which is preferably square in cross-section, comprises a steel shell 22, refractory-lined on all sides. It is fastened substantially symmetrically on furnace top 12, and rotates when the latter is rotated. The distributing trough 11 has a top opening concentric with the furnace top 12 and opening into, and directly below, the vertical passageway from the charge preheater to the distributing trough. At the two opposite ends of the distributor trough, passageways 24, 25 lead down to conforming openings in the furnace top and refractory lining thereof, forming a continuous passageway. One of these passageways in the furnace top is pointed toward the inside periphery of the furnace wall and the other points toward the center of the furnace, so that the charge falling through the hole 24 will deposit near the furnace wall as the top rotates, and the charge coming through hole 25 will deposit at or near the center of the furnace. By means of a hinged baffle plate 23, the charge falling through the passageway 10 into the distributor trough can be diverted toward either one of the openings 24, 25 and thence into the furnace.

In operation, baffle 23 is placed in the position A, indicated in full lines, for a certain period of time, whereby the charge will be diverted to fall through passageway 24 and into the furnace at or near the furnace wall, the charge particles rolling downwardly over the conically-shaped depression forming the surface of the charge, the larger particles rolling down toward the center of the furnace to the bottom of the conical depression, and the smaller sized particles remaining at or near the top of the charge and near the furnace wall. At the end of a predetermined period, the baffle 23 is rotated to position B, indicated in dotted lines, thus allowing the charge to drop into the furnace through the passageway 25 and deposit at or near the center of the furnace where it forms a cone, the finer particles naturally being near the top of the cone, and the coarser particles rolling down the sloping sides of the cone by gravity.

By alternate placing of the charge first near the furnace wall and then near the center of the furnace, an annular zone comprising mostly the larger particles in the charge is obtained intermediate a central area of smaller sized particles and an outer area of finer size particles immediately inside the furnace wall. Furthermore, as is apparent from the vertical cross-section of the furnace, Fig. 1, the mean diameter F of the above annular zone containing the relatively large particles of the charge may be expanded and contracted, depending upon the relative time intervals at which the charge is allowed to run into the furnace through the openings 24, 25. Furthermore, the radial thickness of the annular zone, designated as C, may be made larger or smaller by the manipulation of the length of time that the feed is allowed to run alternately through openings 24 and 25. Thus, three more or less definite vertical zones are obtained in the charge column, the first a central zone D of substantially circular cross-section and containing relatively smaller particles of the charge, the second an annular zone surrounding the central zone and containing the relatively coarse particle sizes of the charge, and the third an annular zone E outside the middle zone and extending to the furnace wall containing the relatively smaller sized particles of the charge.

It is to be observed that the dimensions of these various zones can be changed by the method of feeding alternately through holes 24 and 25 and that no definite line of demarcation between the zones exists.

By referring to Fig. 1, the vertical section of the charge column in the furnace, it will be noted that according to my preferred method of charge distribution, as described above, the coarser particles of the charge not only are deposited in an annular area but in a zig-zag, tortuous path vertically. This is a distinct advantage in inhibiting the formation of straight-line paths of very low resistivity to the passage of electric current between the current-supplying electrodes. Such narrow direct paths result in "streaking" and the formation of liquid slag in the furnace, and when not checked, cause irregular furnace operation and loss of efficiency.

In furnaces of large bore, with charge distribution according to the invention, a much more uniform heat distribution is obtained in the charge, and with proper manipulation the entire charge body in the smelting zone can be kept at or near the smelting temperature of the metal or metals to be smelted.

Electric furnaces of large bore and capacity, operated by the above method of charge distribution, have proven themselves to be more stable in operation, more economical in their electric power consumption, and have made possible substantial savings in costs of repairs and renewals of the refractory linings of the furnaces, all resulting in increased production of the various metals that can be smelted in this type of furnace at lower costs than heretofore.

I claim:

1. In the operation of an electrothermic vertical shaft metal smelting furnace wherein the charge constitutes a resistor the improvement which comprises providing a charge of metalliferous material and solid reducing agent varying in particle size within a predetermined range, and feeding said charge into the upper portion of said furnace alternately adjacent the center line and adjacent the vertical wall thereof to bring about a segregation of at least a portion of the larger sized particles of the charge within a vertical annular zone positioned within the furnace shaft and spaced from the vertical wall thereof.

2. In the operation of an electrothermic vertical shaft metal smelting furnace wherein the charge constitutes a resistor the improvement which comprises providing a charge of metalliferous material and solid reducing agent varying in particle size within a predetermined range, feeding said charge into the upper portion of said furnace alternately adjacent the center line and adjacent the vertical wall thereof to bring about a segregation of at least a portion of the larger sized particles of the charge within a vertical annular zone positioned within the furnace shaft and spaced from the vertical wall thereof, and varying the relative time of feeding the charge adjacent the center line and adjacent the vertical wall of the furnace whereby to vary the mean diameter of said annular zone.

3. In the operation of an electrothermic vertical shaft metal smelting furnace wherein the charge constitutes a resistor the improvement which comprises providing a charge of metalliferous material and solid reducing agent varying in particle size within a predetermined range, feeding said charge into the upper portion of said furnace alternately adjacent the center line and adjacent the vertical wall thereof to bring about a segregation of at least a portion of the larger sized particles of the charge within a vertical annular zone positioned within the furnace shaft and spaced from the vertical wall thereof, and varying the length of time between alternations of feeding the charge adjacent the center line and adjacent the vertical wall of the furnace whereby to vary the radial thickness of said annular zone.

4. In the operation of an electrothermic vertical shaft metal smelting furnace wherein the charge constitutes a resistor the improvement which comprises substantially continuously passing through such furnace a charge of metalliferous material and solid reducing agent varying in particle size within a predetermined range, segregating during charging at least a portion of the larger sized particles of the charge within a vertical annular zone concentrically positioned within the furnace shaft and spaced from the vertical wall thereof, and alternately increasing and decreasing the mean diameter of successive portions of said annular zone.

5. In the operation of an electrothermic vertical shaft metal smelting furnace wherein the charge constitutes a resistor the improvement which comprises providing a charge of metalliferous material and solid reducing agent varying in particle size within a predetermined range, and feeding said charge into the upper portion of said furnace alternately adjacent the center line and adjacent the vertical wall thereof to bring about a segregation of at least a portion of the larger sized particles of the charge within the furnace shaft.

6. In the operation of an electrothermic vertical shaft metal smelting furnace wherein the charge constitutes a resistor the improvement which comprises substantially continuously passing through such furnace a charge of metalliferous material and solid reducing agent varying in particle size within a predetermined range, segregating during charging at least a portion of the larger sized particles of the charge within a vertical annular zone concentrically positioned within the furnace shaft and spaced from the vertical wall thereof, and alternately increasing and decreasing the radial thickness of successive portions of said annular zone.

HERAND K. NAJARIAN.